United States Patent
Nakagawa (10) Patent No.: US 9,084,959 B2
(45) Date of Patent: Jul. 21, 2015

(54) $CO_2$ RECOVERING APPARATUS AND OPERATION CONTROL METHOD OF $CO_2$ RECOVERING APPARATUS

(75) Inventor: Yosuke Nakagawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 121 days.

(21) Appl. No.: 13/807,203

(22) PCT Filed: Aug. 25, 2011

(86) PCT No.: PCT/JP2011/069147
§ 371 (c)(1),
(2), (4) Date: Dec. 27, 2012

(87) PCT Pub. No.: WO2012/117585
PCT Pub. Date: Sep. 7, 2012

(65) Prior Publication Data
US 2013/0333559 A1 Dec. 19, 2013

(30) Foreign Application Priority Data
Feb. 28, 2011 (JP) ................................. 2011-042961

(51) Int. Cl.
*B01D 53/14* (2006.01)
*C01B 31/20* (2006.01)
*B01D 53/62* (2006.01)

(52) U.S. Cl.
CPC ........ *B01D 53/1412* (2013.01); *B01D 53/1475* (2013.01); *C01B 31/20* (2013.01);
(Continued)

(58) Field of Classification Search
CPC ........... B01D 53/1412; B01D 53/1475; B01D 2252/204; B01D 2257/504; B01D 2258/0283; B01D 53/62; C01B 31/20; Y02C 10/04; Y02C 10/06

USPC ............................................................. 95/24
See application file for complete search history.

(56) References Cited

U.S. PATENT DOCUMENTS 3,958,943 A * 5/1976 Carmassi et al. ............. 422/108
3,967,937 A * 7/1976 Hobbs .............................. 95/13
(Continued)

FOREIGN PATENT DOCUMENTS

EP 0066940 A1 12/1982
EP 1201290 A1 5/2002
(Continued)

OTHER PUBLICATIONS

Decision of a Patent Grant dated Jan. 6, 2015, issued in Japanese Application No. 2011-042961, w/English translation. (4 pages).
(Continued)

*Primary Examiner* — Amber Orlando
*Assistant Examiner* — Britanny Precht
(74) *Attorney, Agent, or Firm* — Westerman, Hattori, Daniels & Adrian, LLP (57) ABSTRACT

A $CO_2$ recovering apparatus according to this embodiment includes a cooling tower; a $CO_2$ absorber, a regenerator; an absorbing solution level meter for measuring the amount of liquid at a tower bottom of the $CO_2$ absorber; and a level controller for performing automatic control or manual control for one or both of a supply amount of makeup water and a condensation amount of water contained in an exhaust gas based on the liquid amount of at the bottom of the $CO_2$ absorber detected by the absorbing solution level meter.

7 Claims, 7 Drawing Sheets

(52) U.S. Cl.
CPC .......... *B01D 53/62* (2013.01); *B01D 2252/204* (2013.01); *B01D 2257/504* (2013.01); *B01D 2258/0283* (2013.01); *Y02C 10/04* (2013.01); *Y02C 10/06* (2013.01)

(56) References Cited

U.S. PATENT DOCUMENTS

| | | | | |
|---|---|---|---|---|
| 3,989,465 | A * | 11/1976 | Onnen | 422/110 |
| 4,075,293 | A * | 2/1978 | Grill et al. | 261/20 |
| 4,106,916 | A * | 8/1978 | Tuckett et al. | 95/21 |
| 4,180,548 | A * | 12/1979 | Say et al. | 423/223 |
| 4,210,627 | A * | 7/1980 | Verloop et al. | 423/220 |
| 4,289,738 | A * | 9/1981 | Pearce et al. | 423/228 |
| 4,322,224 | A * | 3/1982 | Roth | 95/11 |
| 4,368,058 | A * | 1/1983 | Crowley et al. | 95/19 |
| 4,386,623 | A * | 6/1983 | Funk et al. | 137/2 |
| 4,435,192 | A * | 3/1984 | Stewart | 95/12 |
| 4,491,566 | A * | 1/1985 | Adams et al. | 423/220 |
| 4,772,298 | A * | 9/1988 | Stewart | 96/252 |
| 4,846,850 | A * | 7/1989 | Webb | 95/19 |
| 5,667,558 | A * | 9/1997 | Bryan et al. | 95/8 |
| 5,667,651 | A * | 9/1997 | Bryan | 204/401 |
| 6,391,093 | B1 * | 5/2002 | French et al. | 95/226 |
| 6,989,051 | B2 * | 1/2006 | Parisi et al. | 96/67 |
| 7,008,469 | B2 * | 3/2006 | Vetter et al. | 96/67 |
| 7,326,387 | B2 * | 2/2008 | Arts et al. | 422/186.3 |
| 7,645,433 | B2 * | 1/2010 | Rhodes et al. | 423/228 |
| 7,699,914 | B1 * | 4/2010 | Morrow et al. | 96/234 |
| 8,062,408 | B2 * | 11/2011 | Chen et al. | 95/163 |
| 8,663,363 | B2 * | 3/2014 | Iijima et al. | 95/8 |
| 8,840,708 | B1 * | 9/2014 | Morrow et al. | 95/172 |
| 2001/0021362 | A1 * | 9/2001 | Ishida | 423/228 |
| 2010/0322842 | A1 * | 12/2010 | Iijima et al. | 423/437.1 |
| 2011/0120308 | A1 * | 5/2011 | Dube et al. | 95/199 |
| 2011/0168017 | A1 * | 7/2011 | Lamers | 95/22 |

FOREIGN PATENT DOCUMENTS

| | | |
|---|---|---|
| JP | 58-98121 A | 6/1983 |
| JP | 61-245824 A | 11/1986 |
| JP | 11-137960 A | 5/1999 |
| JP | 2001-252524 A | 9/2001 |
| JP | 2003-093835 A | 4/2003 |
| JP | 2008-62165 A | 3/2008 |
| JP | 2011-526 A | 1/2011 |
| JP | 2011-529 A | 1/2011 |
| JP | 2011-5367 A | 1/2011 |

OTHER PUBLICATIONS

Japanese Office Action dated Oct. 15, 2013, issued in corresponding Japanese Patent Application No. 2011-042961 with English translation (7 pages).
Written Opinion of PCT/JP2011/069147, mailing date of Dec. 6, 2011.
International Search Report of PCT/JP2011/069147, mailing date of Dec. 6, 2011.
Written Opinion of PCT/JP2011/069147, mailing date of Dec. 6, 2011; (English translation, 3 pages).
Extended European Search Report dated Feb. 27, 2015, issued in corresponding European Patent Application No. 11859860.6 (9 pages).

* cited by examiner

CO₂ RECOVERING APPARATUS AND OPERATION CONTROL METHOD OF CO₂ RECOVERING APPARATUS

FIELD

The present invention relates to a $CO_2$ recovering apparatus that maintains, at a substantially constant level, the concentration of $CO_2$ absorbing solution of a $CO_2$ recovering apparatus which absorbs $CO_2$ in exhaust gas using $CO_2$ absorbing solution, and an operation control method of the $CO_2$ recovering apparatus.

BACKGROUND

In a thermal power plant or the like which uses a large amount of fossil fuel, exhaust gas generated when the fossil fuel is burned in a boiler contains $CO_2$ and the like. As a method of eliminating and recovering $CO_2$ contained in exhaust gas, there is a method of bringing the exhaust gas into gas-liquid contact with an amine $CO_2$ absorbing solution to absorb $CO_2$ in the $CO_2$ absorbing solution. Then, the $CO_2$ is released from the $CO_2$ absorbing solution having absorbed the $CO_2$, and the released $CO_2$ is stored in the ground, thereby preventing the $CO_2$ recovered from the exhaust gas from being released into the atmosphere.

For example, there is proposed a $CO_2$ recovering apparatus that recovers $CO_2$ from exhaust gas by using $CO_2$ absorbing solution and stores $CO_2$ recovered from the exhaust gas along the way (for example, see Patent Literature 1). The $CO_2$ recovering apparatus includes a $CO_2$ absorber that allows the exhaust gas to contact a $CO_2$ absorbing solution and allows the $CO_2$ absorbing solution to absorb $CO_2$ contained in the exhaust gas, and a regenerator that releases $CO_2$ absorbed by the $CO_2$ absorbing solution and separates $CO_2$ from the $CO_2$ absorbing solution. This $CO_2$ recovering apparatus causes the $CO_2$ absorber to absorb the $CO_2$ contained in the exhaust gas in the $CO_2$ absorbing solution and eliminates the $CO_2$ from the exhaust gas, and then causes the regenerator to heat the $CO_2$ absorbing solution with vapor, thereby releasing the $CO_2$ absorbed by the $CO_2$ absorbing solution and recovering high-purity $CO_2$. Further, the $CO_2$ absorbing solution regenerated by the regenerator is fed to the $CO_2$ absorber again and is recycled.

In this $CO_2$ recovering apparatus, $CO_2$ and a small amount of $H_2O$ are flown out of the regenerator. In order to keep the liquid amount of the absorbing solution in a space between the $CO_2$ absorber and the regenerator (hereinafter referred to as "system space") at a certain amount, makeup water is added to the system space or the condensation amount of water contained in the exhaust gas within the $CO_2$ absorber is adjusted. The condensation amount of water contained in the exhaust gas within the $CO_2$ absorber is controlled by, for example, a method of adjusting the cooling ratio of the exhaust gas by using a cooling tower or the like provided at the upstream side of the absorber, or a method of adjusting the cooling temperature of the $CO_2$ absorbing solution within the $CO_2$ absorber.

In the $CO_2$ recovering apparatus, the absorber or the regenerator is provided with an absorbing solution level meter and a level controller, and the condensation amount of water contained in the exhaust gas or the supply amount of makeup water is adjusted to thereby maintain the liquid level at a constant liquid level.

CITATION LIST

Patent Literature

Patent Literature 1: Japanese Patent Application Laid-open No 2008-062165

SUMMARY

Technical Problem

In the conventional $CO_2$ recovering apparatus, when the gas supply amount of the exhaust gas to be supplied to the $CO_2$ absorber is changed, the accumulation amount (liquid hold-up amount) of the $CO_2$ absorbing solution accumulated in a filler ($CO_2$ recovering unit) provided in the $CO_2$ absorber changes. When the $CO_2$ absorbing solution is accumulated in the $CO_2$ recovering unit, the level controller maintains, at a constant level, the flow rate of the $CO_2$ absorbing solution that circulates in the system space. Accordingly, the level controller operates to perform adjustment by condensing $H_2O$ contained in the exhaust gas by the amount corresponding to the accumulation amount of the $CO_2$ absorbing solution accumulated in the $CO_2$ recovering unit, or by increasing the supply amount of makeup water.

The level controller increases the condensation amount of water contained in the exhaust gas or increases the supply amount of makeup water in the state where the accumulation amount of the $CO_2$ absorbing solution in the $CO_2$ recovering unit is not taken into consideration. This causes a problem that the concentration of the $CO_2$ absorbing solution in the system space is lowered. Accordingly, the $CO_2$ absorption performance of the $CO_2$ contained in the exhaust gas in the $CO_2$ absorber is lowered.

The present invention has been made in view of the above-mentioned circumstances, and therefore an object of the present invention is to provide a $CO_2$ recovering apparatus capable of stably maintaining the concentration of $CO_2$ absorbing solution at a constant level.

Solution to Problem

According to a first aspect of the present invention in order to solve the above problems, there is provided a $CO_2$ recovering apparatus including: a cooling tower that allows an exhaust gas containing $CO_2$ to contact water and cools the exhaust gas; a $CO_2$ absorber that allows the exhaust gas to contact a $CO_2$ absorbing solution that absorbs $CO_2$ and eliminates $CO_2$ from the exhaust gas; an absorbing solution regenerator that releases $CO_2$ from the $CO_2$ absorbing solution having absorbed $CO_2$ and regenerates the $CO_2$ absorbing solution; an absorbing solution level meter that measures a liquid level of the $CO_2$ absorbing solution at a tower bottom of the $CO_2$ absorber; and a level controller that performs one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter, wherein while a gas supply amount of the exhaust gas to be supplied to the $CO_2$ absorber is not changed, the level controller is switched to the automatic control, and while the gas supply amount of the exhaust gas to be supplied to the $CO_2$ absorber is changed, the level controller is switched to the manual control, to thereby maintain, at a constant level, one or both of the supply amount of the makeup water and the condensation amount of the water contained in the exhaust gas.

According to a second aspect of the present invention, there is provided the $CO_2$ recovering apparatus according to the first aspect, wherein each measured value with the liquid level of the $CO_2$ absorbing solution at the tower bottom of the $CO_2$ absorber, the supply amount of the makeup water, the accumulation amount of the $CO_2$ absorbing solution, and the gas supply amount of the exhaust gas at the time when a change in the gas supply amount of the exhaust gas supplied to the $CO_2$ absorber is constant and the level controller is switched from the manual control to the automatic control is changed to a set value as a reference for each value.

According to a third aspect of the present invention, there is provided a $CO_2$ recovering apparatus including: a cooling tower that allows an exhaust gas containing $CO_2$ to contact water and cools the exhaust gas; a $CO_2$ absorber including a $CO_2$ recovering unit that allows a $CO_2$ absorbing solution that absorbs $CO_2$ to contact the exhaust gas, and eliminates $CO_2$ from the exhaust gas; an absorbing solution regenerator that releases $CO_2$ from the $CO_2$ absorbing solution having absorbed $CO_2$ and regenerates the $CO_2$ absorbing solution; an absorbing solution level meter that measures a liquid level of the $CO_2$ absorbing solution at a tower bottom of the $CO_2$ absorber; and a level controller that performs one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter, wherein while a gas supply amount of the exhaust gas to be supplied to the $CO_2$ absorber is changed, one of the gas supply amount of the exhaust gas to be supplied to the $CO_2$ absorber and a load of an apparatus that generates the exhaust gas is applied to a relationship between one of the preliminarily obtained gas supply amount of the exhaust gas and the load of the apparatus that generates the exhaust gas, and a set value of the liquid level of the $CO_2$ absorbing solution at the tower bottom of the $CO_2$ absorber detected by the absorbing solution level meter, and the level controller controls the set value of one or both of the supply amount of the makeup water and the condensation amount of water contained in the exhaust gas.

According to a fourth aspect of the present invention, there is provided the $CO_2$ recovering apparatus according to any one of the first to third aspects, wherein the condensation amount of water contained in the exhaust gas is adjusted using one or both of a method of changing, by the cooling tower, a cooling ratio of the exhaust gas, and a method of changing a cooling temperature of the $CO_2$ absorbing solution within the $CO_2$ absorber.

According to a fifth aspect of the present invention, there is provided the $CO_2$ recovering apparatus according to any one of the first to fourth aspects, further including: an absorbing solution extraction pipe that extracts the $CO_2$ absorbing solution at the bottom of the $CO_2$ absorber; an absorbing solution storage unit that stores the extracted $CO_2$ absorbing solution; and an absorbing solution feed pipe that feeds the $CO_2$ absorbing solution within the absorbing solution storage unit to the bottom of the $CO_2$ absorber, wherein the liquid level of the $CO_2$ absorbing solution at the bottom of the $CO_2$ absorber is adjusted according to a loading state of the apparatus that generates the exhaust gas.

According to a sixth aspect of the present invention, there is provided an operation control method of a $CO_2$ recovering apparatus including a $CO_2$ absorber including a $CO_2$ recovering unit that brings an exhaust gas containing $CO_2$ into contact with water to cool the exhaust gas and brings the exhaust gas into contact with a $CO_2$ absorbing solution absorbing $CO_2$ to eliminate $CO_2$ contained the exhaust gas; and a regenerator that eliminates $CO_2$ contained in the $CO_2$ absorbing solution having absorbed $CO_2$ to regenerate the $CO_2$ absorbing solution, the operation control method including: recycling, by the $CO_2$ absorber, the $CO_2$ absorbing solution obtained by eliminating $CO_2$ by the regenerator; measuring, by an absorbing solution level meter, a liquid level of the $CO_2$ absorbing solution at a tower bottom of the $CO_2$ absorber; and performing, by a level controller, one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter, wherein the level controller is switched to the automatic control while a change in the gas supply amount of the exhaust gas to be supplied to the $CO_2$ absorber is finished, and the level controller is switched to the manual control while the gas supply amount of the exhaust gas to be supplied to the $CO_2$ absorber is changed, to thereby maintain, at a constant level, one or both of the supply amount of the makeup water and the condensation amount of water contained in the exhaust gas.

According to a seventh aspect of the present invention, there is provided the operation control method of a $CO_2$ recovering apparatus according to the sixth aspect, wherein each measured value with the liquid level of the $CO_2$ absorbing solution at the tower bottom of the $CO_2$ absorber, the supply amount of the makeup water, the accumulation amount of the $CO_2$ absorbing solution, and the gas supply amount of the exhaust gas at the time when a change in the gas supply amount of the exhaust gas supplied to the $CO_2$ absorber is constant and the level controller is switched from the manual control to the automatic control is changed to a set value as a reference for each value.

According to an eighth aspect of the present invention, there is provided an operation control method of a $CO_2$ recovering apparatus including a $CO_2$ absorber including a $CO_2$ recovering unit that brings an exhaust gas containing $CO_2$ into contact with water to cool the exhaust gas and brings the exhaust gas into contact with a $CO_2$ absorbing solution to eliminate $CO_2$ contained in the exhaust gas; and a regenerator that eliminates $CO_2$ contained in the $CO_2$ absorbing solution having absorbed $CO_2$ to regenerate the $CO_2$ absorbing solution, the operation control method including: recycling, by the $CO_2$ absorber, the $CO_2$ absorbing solution obtained by eliminating $CO_2$ by the regenerator; measuring, by an absorbing solution level meter, a liquid level of the $CO_2$ absorbing solution at a tower bottom of the $CO_2$ absorber; and performing, by a level controller, one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter; and wherein while a gas supply amount of the exhaust gas to be supplied to the $CO_2$ absorber is changed, one of the gas supply amount of the exhaust gas to be supplied to the $CO_2$ absorber and a load of an apparatus that generates the exhaust gas is applied to a relationship between one of the preliminarily obtained gas supply amount of the exhaust gas and the load of the apparatus that generates the exhaust gas, and a set value of the liquid level of the $CO_2$ absorbing solution at the bottom of the $CO_2$ absorber detected by the absorbing solution level meter, and the level controller controls the set value of one or both of the supply amount of the makeup water and the condensation amount of water contained in the exhaust gas.

According to a ninth aspect of the present invention, there is provided the operation control method of a $CO_2$ recovering apparatus according to any one of the sixth to eighth aspects, wherein the condensation amount of water contained in the exhaust gas is adjusted by using one or both of a method of changing a cooling ratio of the exhaust gas by the cooling tower, and a method of changing a cooling temperature of the $CO_2$ absorbing solution within the $CO_2$ absorber.

According to a tenth aspect of the present invention, there is provided the operation control method of a $CO_2$ recovering apparatus according to any one of the sixth to ninth aspects, further including: extracting the $CO_2$ absorbing solution at the bottom of the $CO_2$ absorber depending on a loading state of the apparatus that generates the exhaust gas; storing the extracted $CO_2$ absorbing solution, or feeding the stored $CO_2$ absorbing solution to the bottom of the $CO_2$ absorber; and adjusting a liquid amount of the $CO_2$ absorbing solution at the bottom of the $CO_2$ absorber.

Advantageous Effects of Invention

According to the present invention, the concentration of a $CO_2$ absorbing solution can be stably maintained at a constant level. This allows the absorption amount of $CO_2$ contained in an exhaust gas to the $CO_2$ absorbing solution to be stably maintained. Furthermore, the $CO_2$ absorbing solution can be efficiently used without wasting amine contained in the $CO_2$ absorbing solution. Accordingly, the steam required for releasing the $CO_2$ contained in the $CO_2$ absorbing solution can be efficiently utilized by the regenerator, which results in improvement in operational efficiency of the $CO_2$ recovering apparatus.

DESCRIPTION OF EMBODIMENTS

Hereinafter, the present invention will be described in detail with reference to the drawings. Note that the present invention is not limited by the below-mentioned modes for carrying out the invention (hereinafter referred to as "embodiments"). The components in the embodiments described below include components that can be easily assumed by those skilled in the art, and substantially the same components, that is, so-called equivalent components. Further, the components disclosed in the embodiments described below can be combined as needed.

First Embodiment

Figure 1:
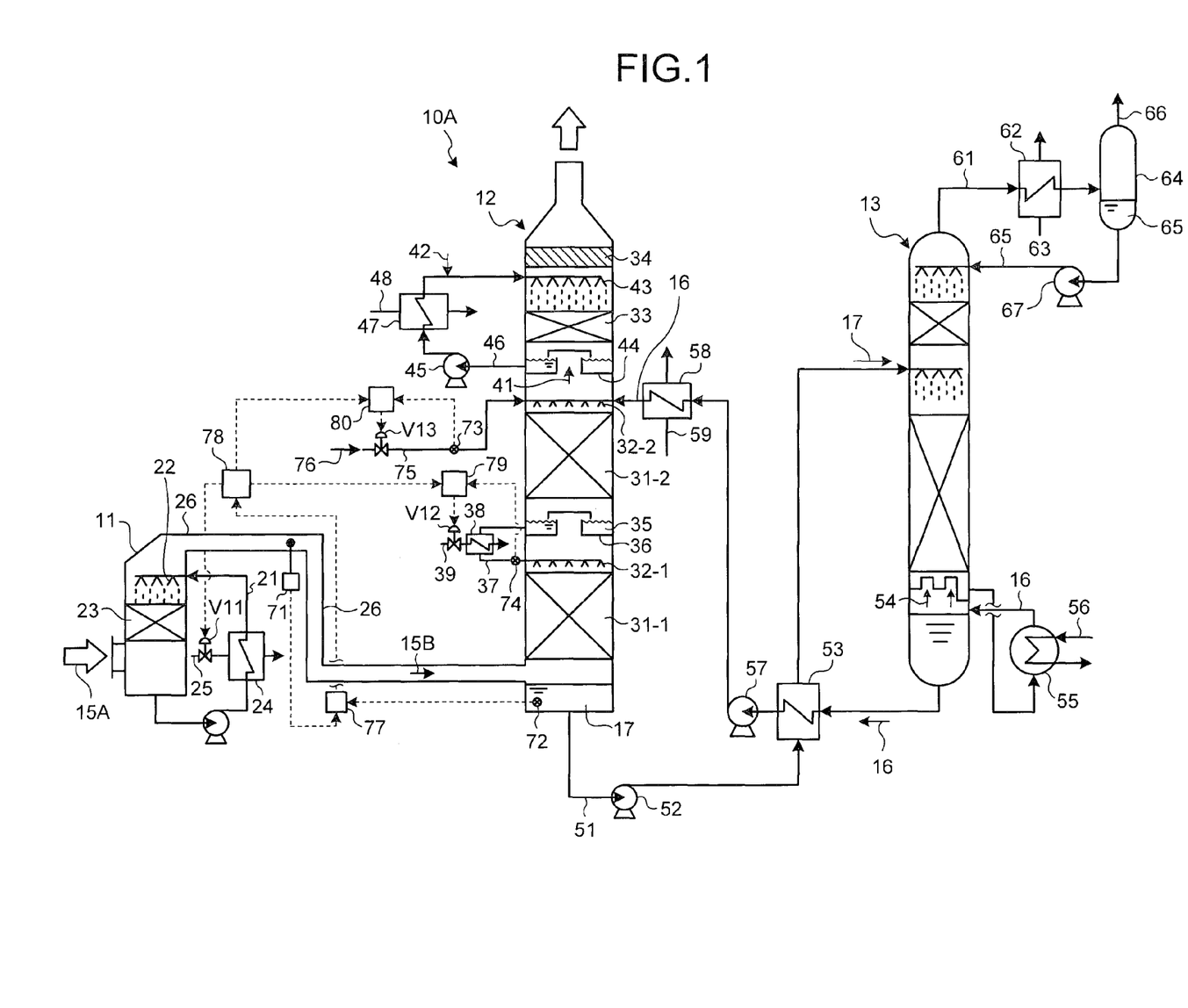
FIG. 1 is a diagram schematically illustrating a configuration of a $CO_2$ recovering apparatus according to a first embodiment of the present invention.

A $CO_2$ recovering apparatus according to a first embodiment of the present invention will be described with reference to the drawings. FIG. 1 is a diagram schematically illustrating the configuration of the $CO_2$ recovering apparatus according to the first embodiment of the present invention. As illustrated in FIG. 1, a $CO_2$ recovering apparatus 10A includes a cooling tower 11, a $CO_2$ absorber 12, and an absorbing solution regenerator (hereinafter referred to as "regenerator") 13.

In the $CO_2$ recovering apparatus 10A, a $CO_2$ absorbing solution 16 that absorbs $CO_2$ in an exhaust gas 15A containing $CO_2$ circulates in a space between the $CO_2$ absorber 12 and the regenerator 13 (hereinafter referred to as "system space"). A $CO_2$ absorbing solution (rich solution) 17 having absorbed $CO_2$ in an exhaust gas 15B is fed to the regenerator 13 from the $CO_2$ absorber 12. The $CO_2$ absorbing solution (lean solution) 16 regenerated by eliminating almost all $CO_2$ from the rich solution 17 by the regenerator 13 is fed to the $CO_2$ absorber 12 from the regenerator 13.

The exhaust gas 15A is a gas containing $CO_2$ discharged from industrial facilities such as a boiler and a gas turbine. The exhaust gas 15A is boosted by an exhaust gas blower or the like and is then sent to the cooling tower 11.

The cooling tower 11 is a tower that cools the exhaust gas 15A with water 21. The cooling tower 11 includes a spray nozzle 22 that atomizes the water 21 into the tower, and a cooling unit 23. The cooling unit 23 in the cooling tower 11 cools the exhaust gas 15A by bringing the exhaust gas into counterflow contact with the water 21 atomized from the spray nozzle 22.

The water 21 which is increased in temperature through heat exchange with the exhaust gas 15A is stored at the tower bottom of the cooling tower 11. The water 21 at the tower bottom is extracted from the tower bottom and cooled by a cooler 24 through heat exchange with chilled water 25, and is then fed to the cooling tower 11. This allows the water 21 to be circulated and used for cooling the exhaust gas 15A.

The cooled exhaust gas 15B is discharged from the cooling tower 11 through a flue 26 which couples the cooling tower 11 and the $CO_2$ absorber 12.

The exhaust gas 15B discharged from the cooling tower 11 is sent into the $CO_2$ absorber 12 from a side wall of tower bottom of the $CO_2$ absorber 12 through the flue 26.

The $CO_2$ absorber 12 is a tower that allows the exhaust gas 15B and the $CO_2$ absorbing solution 16 to contact each other to eliminate $CO_2$ from the exhaust gas 15B. The $CO_2$ absorber 12 includes $CO_2$ recovering units 31-1 and 31-2, spray nozzles 32-1 and 32-2, a washing unit 33, and a demister 34. The exhaust gas 15B fed into the tower flows toward the tower top side from the tower bottom side within the tower. The spray nozzle 32-2 is a nozzle that atomizes the $CO_2$ absorbing solution 16 downwardly. The $CO_2$ recovering units 31-1 and 31-2 are provided at the front flow side in the flow direction of the exhaust gas 15B of the $CO_2$ absorber 12. In this embodiment, the $CO_2$ recovering units 31-1 and 31-2 are provided at the lower side of the tower of the $CO_2$ absorber 12.

In the $CO_2$ recovering units 31-1 and 31-2, the exhaust gas 15B that ascends in the tower is brought into counterflow contact with the $CO_2$ absorbing solution 16 mainly including a basic amine compound, for example, and $CO_2$ in the exhaust gas 15B is absorbed by the $CO_2$ absorbing solution 16. After the lean solution 16 is atomized from the spray nozzle 32-2 and passed through the $CO_2$ recovering unit 31-2, a semi-rich solution 35 having absorbed $CO_2$ remaining in the exhaust gas 15B is stored by a receiving unit 36. The semi-rich solution 35 stored in the receiving unit 36 is extracted from a semi-rich solution extraction pipe 37 and cooled with chilled water 39 by a cooler 38. After that, the semi-rich solution 35 is atomized from the spray nozzle 32-1 and passed through the $CO_2$ recovering unit 31-1 and is then stored at the tower bottom as the rich solution 17.

In this embodiment, the $CO_2$ absorber 12 is provided with the two-stage $CO_2$ recovering unit, but this embodiment is not limited to this. A one-stage or three- or more-stage $CO_2$ recovering unit may be provided.

The washing unit 33 and the demister 34 are provided at the backflow side in the flow direction of the exhaust gas 15B of the $CO_2$ absorber 12. In this embodiment, the washing unit 33 and the demister 34 are provided the upper side of the $CO_2$ recovering unit 31-2 within the tower. A $CO_2$ removed exhaust gas 41 obtained by eliminating $CO_2$ by the $CO_2$ recovering units 31-1 and 31-2 is released to the outside of the system from the tower top after the $CO_2$ absorbing solution 16 accompanied with the $CO_2$ removed exhaust gas 41 is eliminated by the washing unit 33 and the mist contained in the $CO_2$ removed exhaust gas 41 is captured by the demister 34. Note that a plurality of washing units 33 may be provided.

The washing unit 33 allows a spray nozzle 43 to atomize water 42, which is externally supplied, and eliminates impurities contained in the $CO_2$ removed exhaust gas 41 by the washing unit 33. The water 42 atomized from the spray nozzle 43 is recovered by a receiving unit 44 and is fed to the outside of the tower by a pump 45. After the water 42 is cooled with chilled water 48 by a cooler 47 through a water circulation line 46, the water 42 is fed to the spray nozzle 43 and circulated and used.

The rich solution 17 having absorbed $CO_2$ contained in the exhaust gas 15B in the $CO_2$ recovering units 31-1 and 31-2 are accumulated at the bottom of the $CO_2$ absorber 12. The rich solution 17 accumulated at the bottom of the $CO_2$ absorber 12 is extracted from a rich solution ejection line 51, and is pumped by a rich solution discharge pump (rich solvent pump) 52 provided outside from the tower bottom of the $CO_2$ absorber 12. After heat exchange with the $CO_2$ absorbing solution 16 regenerated by the regenerator 13 in a rich/lean solution heat exchanger 53, the rich solution 17 is supplied into the tower from the tower top of the regenerator 13.

The regenerator 13 is a tower that releases $CO_2$ from the rich solution 17 and regenerates it into a lean solution 16. The rich solution 17 released from the tower top of the regenerator 13 into the tower of the regenerator 13 is heated by a vapor (steam) 54 supplied from the tower bottom of the regenerator 13. The steam 54 is generated by exchanging heat of the lean solution 16 with saturated steam 56 in a regeneration superheater (reboiler) 55. The heat of the rich solution 17 is absorbed by being heated by the steam 54, and most of the $CO_2$ contained in the rich solution 17 is released. When the rich solution 17 reaches the tower bottom of the regenerator 13, almost all the $CO_2$ is eliminated to thereby obtain the $CO_2$ absorbing solution (lean solution) 6.

The lean solution 16 accumulated at the bottom of the regenerator 13 is fed as a $CO_2$ absorbing solution by a lean solvent pump 57 and is cooled through heat exchange with chilled water 59 by a lean solvent cooler 58, and is then fed to the $CO_2$ absorber 12.

On the other hand, a $CO_2$ gas 61 accompanied with vapor is released from the tower top of the regenerator 13. The $CO_2$ gas 61 accompanied with vapor is led out from the tower top of the regenerator 13, and the vapor contained in the $CO_2$ gas 61 is condensed with chilled water 63 by a condenser 62. After water 65 is separated by a separation drum 64, a $CO_2$ gas 66 is released to the outside of the system and recovered. Further, the water 65 separated by the separation drum 64 is supplied to an upper portion of the regenerator 13 in a condensed water circulating pump 67.

The $CO_2$ recovering apparatus 10A according to this embodiment includes a supply gas flowmeter 71, an absorbing solution level meter 72, a makeup water flowmeter 73, and a thermometer 74. The supply gas flowmeter 71 is provided in the flue 26 and measures the flow rate of the exhaust gas 15B. The absorbing solution level meter 72 is provided at the tower bottom, which is a liquid pool of the $CO_2$ absorber 12, and measures the liquid level (liquid height) of the rich solution 17 accumulated at the tower bottom. The makeup water flowmeter 73 is provided to a makeup water supply line 75, and measures the flow rate of makeup water 76. The thermometer 74 is provided to the semi-rich solution extraction pipe 37, and measures the temperature of the semi-rich solution 35.

The values measured by the supply gas flowmeter 71 and the absorbing solution level meter 72 are transmitted to a level controller 77. The level controller 77 transmits the calculated value to a manipulation unit 78 based on the value measured by the absorbing solution level meter 72, and adjusts one or both of the supply amount of the makeup water 76 and the condensation amount of water contained in the exhaust gas 15B. The condensation amount of water contained in the exhaust gas 15B can be adjusted using one or both of a method of increasing the cooling ratio of the exhaust gas 15B by the cooling tower 11, and a method of lowering the cooling temperature of the semi-rich solution 35 in the $CO_2$ absorber 12.

When the cooling ratio of the exhaust gas 15B is increased by the cooling tower 11, the control valve V11 is adjusted and the flow rate of the chilled water 25 is increased to further lower the liquid temperature of the water 21. When the gas temperature of the exhaust gas 15B is further lowered to cool the exhaust gas 15B, water contained in the exhaust gas 15A is condensed by the cooling tower 11, so that the condensation amount of water contained in the exhaust gas 15B decreases. In the case of lowering the cooling temperature of the semi-rich solution 35 within the $CO_2$ absorber 12, the degree of opening/closing of the control valve V12 is adjusted to further lower the liquid temperature of the semi-rich solution 35. When the gas temperature of the contacting exhaust gas 15B is lowered by the $CO_2$ recovering unit 31-1, the condensation amount of water contained in the exhaust gas 15B increases.

The level controller 77 causes the manipulation unit 78 to adjust the control valve V11 to adjust the flow rate of the chilled water 25, causes a control unit 79 to adjust the control valve V12 to adjust the flow rate of the chilled water 39, or causes a control unit 80 to adjust a control valve V13, based on the values measured by the supply gas flowmeter 71 and the absorbing solution level meter 72, thereby adjusting the flow rate of the makeup water 76.

(Operation Control)

Next, a description is given of an example of the operation control for stably keeping the concentration of the $CO_2$ absorbing solution 16, which circulates in the system space, at a constant level, even when the gas supply amount of the exhaust gas 15B to be supplied to the $CO_2$ absorber 12 by using the $CO_2$ recovering apparatus 10A according to this embodiment is changed.

Figure 2:
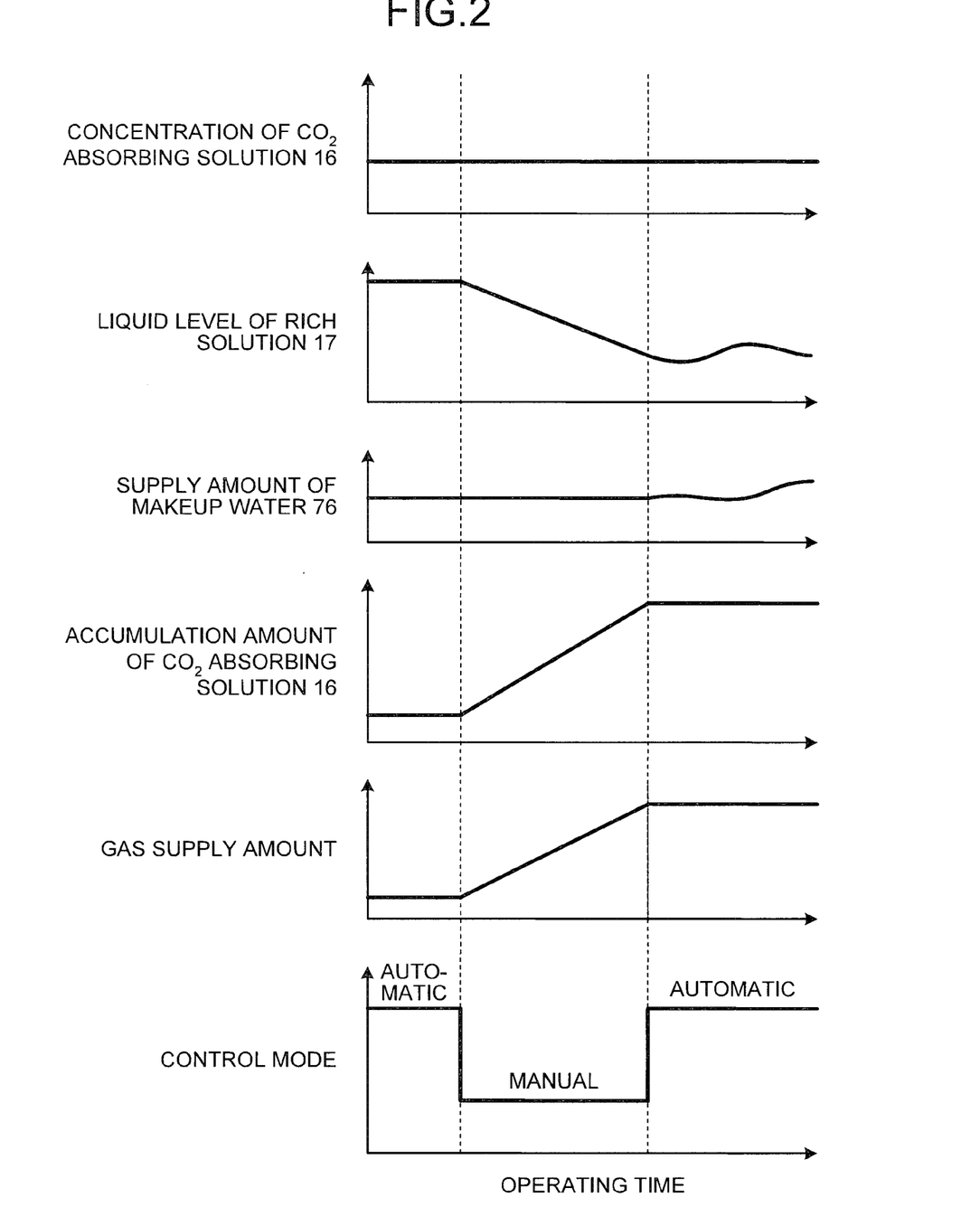
FIG. 2 is a diagram illustrating an example of a relationship between an operating time and various measured values when the $CO_2$ recovering apparatus according to the first embodiment of the present invention is adjusted with makeup water.

The gas supply amount of the exhaust gas 15B to the $CO_2$ absorber 12 is measured by the supply gas flowmeter 71. FIG. 2 is a diagram illustrating the relationship between the operating time and various measured values when the $CO_2$ recovering apparatus 10A according to this embodiment is adjusted by the makeup water 76. As illustrated in FIG. 2, while the gas supply amount of the exhaust gas 15B, which is measured by the supply gas flowmeter 71, to the $CO_2$ absorber 12 is not changed (the gas supply amount is constant), the measurement is carried out by the level controller 77 through the automatic control. During this period, the accumulation amount (liquid hold-up amount) of the $CO_2$ absorbing solution 16 in the $CO_2$ recovering unit 31-2, the supply amount of the makeup water 76, and the liquid level of the rich solution 17 accumulated at the tower bottom of the $CO_2$ absorber 12 are constant.

The automatic control may adopt a continuous measurement or a periodical measurement. The measurement interval is not particularly limited.

When the gas supply amount measured by the supply gas flowmeter 71 is changed (when the gas supply amount is increased in this embodiment), the level controller 77 is switched from the automatic control to the manual control to carry out the measurement. This manual control of the level controller 77 is carried out while the gas supply amount of the exhaust gas 15B to the $CO_2$ absorber 12. When the gas supply amount of the exhaust gas 15B is increased, the accumulation amount of the $CO_2$ absorbing solution 16 in the $CO_2$ recovering units 31-1 and 31-2 is increased, the liquid amount of the rich solution 17 accumulated at the tower bottom of the $CO_2$ absorber 12 is lowered, and the liquid level measured by the absorbing solution level meter 72 is lowered. Accordingly, the automatic control is maintained to carry out the measurement by the level controller 77, the level controller 77 performs control to add the makeup water 76 to the $CO_2$ absorber 12 or increase the condensation amount of water contained in the exhaust gas 15B within the $CO_2$ absorber 12 so as to keep the liquid amount of the $CO_2$ absorbing solution 16 circulating in the system space at a constant amount.

On the other hand, in the case of performing the operation control by using the $CO_2$ recovering apparatus 10A according to this embodiment, when the gas supply amount of the exhaust gas 15B supplied to the $CO_2$ absorber 12 increases, the accumulation amount of the $CO_2$ absorbing solution 16 in the $CO_2$ recovering unit 31-2 increases. However, switching to the manual control to carry out the measurement by the level controller 77 makes it possible to maintain the supply amount of the makeup water 76 and the condensation amount of water contained in the exhaust gas 15B at a constant level. This allows the concentration of the $CO_2$ absorbing solution 16 to be maintained at a constant level.

At the time when the change in the gas supply amount of the exhaust gas 15B to the $CO_2$ absorber 12 is changed, the level controller 77 is switched from the manual control to the automatic control. The measured values with the liquid level of the rich solution 17 at the bottom of the $CO_2$ absorber 12 at the time of switching, the supply amount of the makeup water 76, the accumulation amount of the $CO_2$ absorbing solution 16 in the $CO_2$ recovering unit 31-2, and the gas supply amount of the exhaust gas 15B are used as set values as a reference.

While the gas supply amount of the exhaust gas 15B to the $CO_2$ absorber 12 is constant, the level controller 77 adjusts, through the automatic control, the degree of opening/closing of the control valve V13 to adjust the supply amount of the makeup water 76 or adjust the condensation amount of water contained in the exhaust gas 15B, based on the liquid level of the rich solution 17 at the bottom of the $CO_2$ absorber 12 which is detected by the absorbing solution level meter 72. In the case of adjusting the condensation amount of water contained in the exhaust gas 15B, as described above, there are methods such as the method of increasing the cooling ratio of the exhaust gas 15B by the cooling tower 11 to increase the condensation amount of water contained in the exhaust gas 15B, and the method of lower the cooling temperature of the semi-rich solution 35 in the $CO_2$ absorber 12 to further lower the gas temperature of the exhaust gas 15B contacting with the semi-rich solution 35 and increasing the condensation amount of water contained in the exhaust gas 15B. In the case of increasing the condensation amount of water contained in the exhaust gas 15B, one or both of these methods are employed.

Therefore, in the case of performing the operation control by using the $CO_2$ recovering apparatus 10A according to this embodiment, while the gas supply amount of the exhaust gas 15B is increased and the amount of the semi-rich solution 35 stored in the $CO_2$ recovering unit 31-1 is increased, the measurement is carried out by the level controller 77 through the manual control, and the control for the liquid level of the rich solution 17 is not carried out. This results in suppression of an increase in the supply amount of the makeup water 76 and the condensation amount of water contained in the exhaust gas 15B, thereby maintaining the concentration of the $CO_2$ absorbing solution 16 at a constant level. As a result, the $CO_2$ absorption performance in the exhaust gas 15B in the $CO_2$ absorber 12 can be maintained.

In this manner, even when the liquid level of the rich solution 17 at the bottom of the $CO_2$ absorber 12, which is detected by the absorbing solution level meter 72, changes due to the change in the gas supply amount of the exhaust gas 15B to the $CO_2$ absorber 12, the $CO_2$ recovering apparatus 10A according to this embodiment can switch the level controller 77 from the automatic control to the manual control and maintain the supply amount of the makeup water 76 and the condensation amount of water contained in the exhaust gas 15B at a constant level. This results in suppression of an increase in the supply amount of the makeup water 76 supplied to the system space and the condensation amount of water contained in the exhaust gas 15B. Therefore, even when the operation is carried out for a long period of time, the concentration of the $CO_2$ absorbing solution 16 can be maintained at a constant level.

Therefore, the $CO_2$ recovering apparatus 10A according to this embodiment is capable of stably maintaining the absorption performance of $CO_2$ contained in the exhaust gas 15B to the $CO_2$ absorbing solution 16. Further, the $CO_2$ absorbing solution 16 can be efficiently used without wasting amine contained in the $CO_2$ absorbing solution 16. Consequently, the steam 54 required to release $CO_2$ contained in the rich solution 17 by the regenerator 13 can be effectively used, thereby improving the operational efficiency of the $CO_2$ recovering apparatus 10A.

Second Embodiment

A $CO_2$ recovering apparatus according to a second embodiment of the present invention will be described with reference to the drawings. Note that the configuration of the $CO_2$ recovering apparatus according to this embodiment is similar to the configuration of the $CO_2$ recovering apparatus illustrated in FIG. 1 described above.

Accordingly, the components identical with those of the $CO_2$ recovering apparatus illustrated in FIG. 1 are denoted by the same reference numerals, and the description thereof is omitted.

Figure 3:
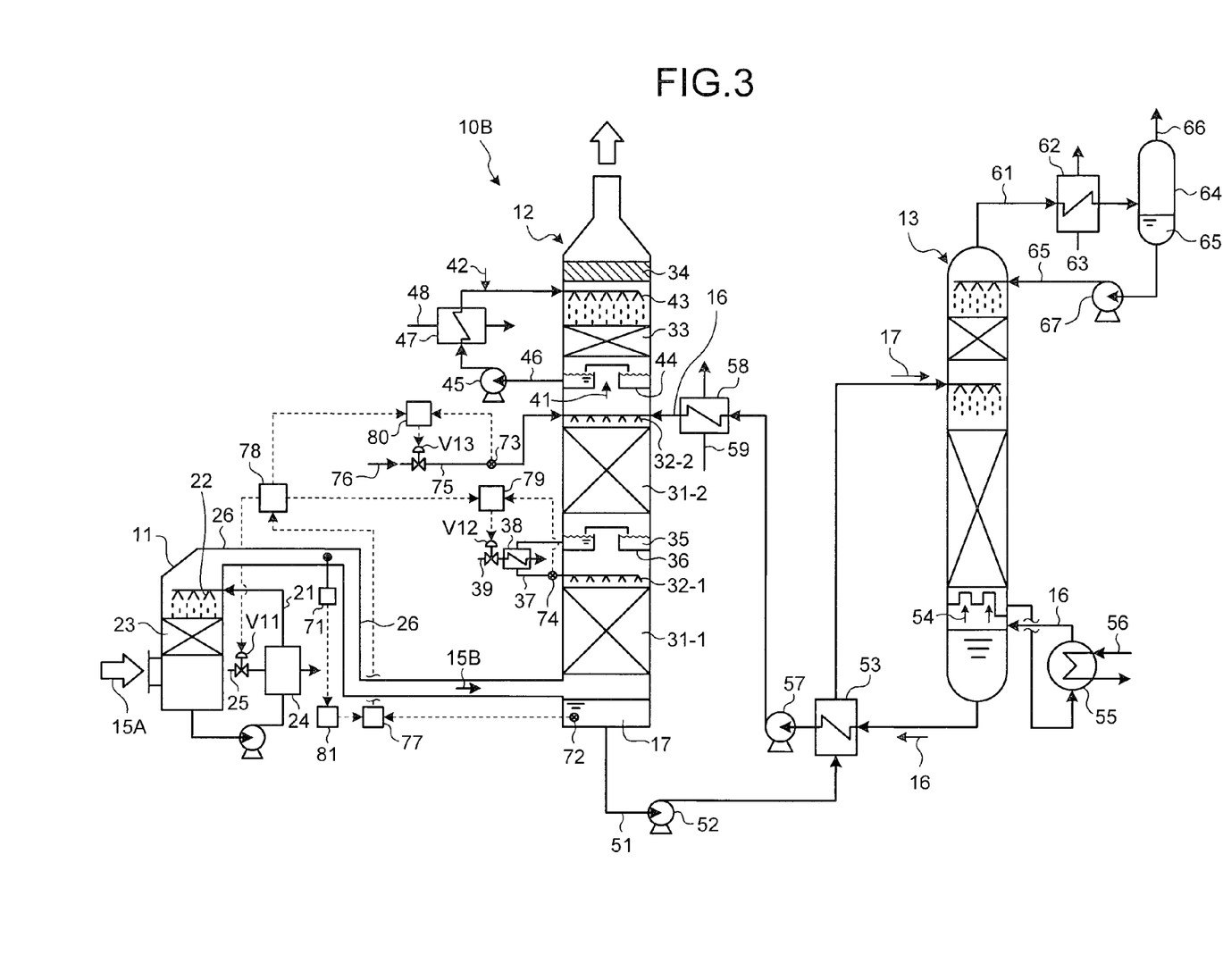
FIG. 3 is a diagram schematically illustrating a configuration of a $CO_2$ recovering apparatus according to a second embodiment of the present invention.

FIG. 3 is a diagram schematically illustrating the configuration of the $CO_2$ recovering apparatus according to the second embodiment of the present invention. As illustrated in FIG. 3, a $CO_2$ recovering apparatus 10B according to this embodiment includes a calculation unit 81 that obtains a liquid level of the rich solution 17 at the bottom of the $CO_2$ absorber 12 from the value measured by the supply gas flowmeter 71. The calculation unit 81 applies the relationship diagram illustrating the relationship between the measured value of the gas flow rate of the exhaust gas 15B measured by the supply gas flowmeter 71, the obtained gas supply amount of the exhaust gas 15B, and the set value of the liquid level of the rich solution 17 at the bottom of the $CO_2$ absorber 12 detected by the absorbing solution level meter 72.

Figure 4:
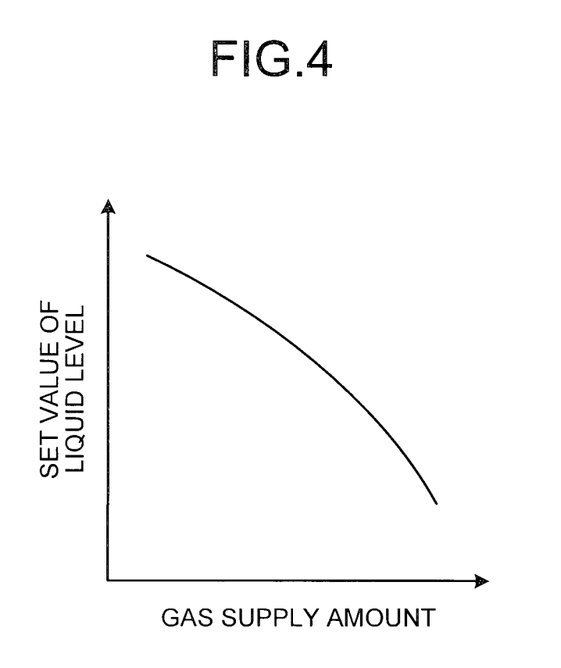
FIG. 4 is a diagram illustrating an example of a relationship between a gas supply amount of exhaust gas and a set value of a liquid level.

FIG. 4 is a diagram illustrating an example of the relationship between the gas supply amount of the exhaust gas 15B and the set value of the liquid level. As illustrated in the relationship diagram of FIG. 4, the application of the measured value of the gas flow rate of the exhaust gas 15B measured by the supply gas flowmeter 71 enables adjustment of the liquid level of the rich solution 17 at the bottom of the $CO_2$ absorber 12. Accordingly, even when the supply amount of the exhaust gas 15B increases and the accumulation amount of the $CO_2$ absorbing solution 16 in the $CO_2$ recovering unit 31-2 increases, the supply amount of the makeup water 76 can be properly adjusted, so that the concentration of the $CO_2$ absorbing solution 16 can be maintained at a constant level.

(Operation Control)

Next, a description is given of an example of the operation control for stably keeping, at a constant level, the concentration of the $CO_2$ absorbing solution 16 which circulates in the supply space even when the gas supply amount of the exhaust gas 15B supplied to the $CO_2$ absorber 12 by using the $CO_2$ recovering apparatus 10B according to this embodiment.

Figure 5:
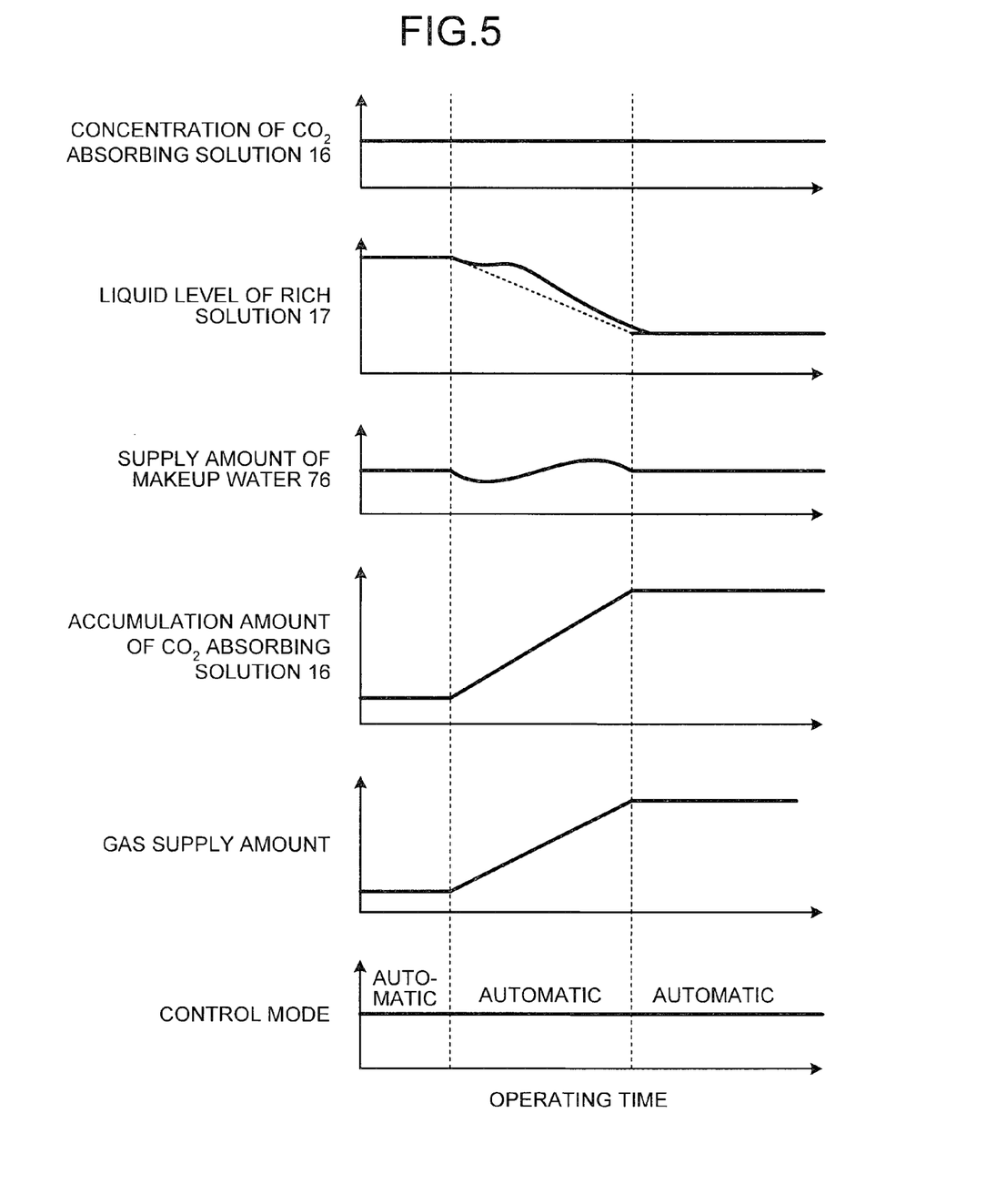
FIG. 5 is a diagram illustrating a relationship between an operating time and various measured values of the $CO_2$ recovering apparatus according to the second embodiment of the present invention.

FIG. 5 is a diagram illustrating a relationship between the operating time and various measured values of the $CO_2$ recovering apparatus 10B according to this embodiment. As illustrated in FIG. 5, while the gas supply amount of the exhaust gas 15B, which is measured by the supply gas flowmeter 71, to the $CO_2$ absorber 12 is not changed (at a constant gas supply amount), the measurement by the level controller 77 is carried out by the automatic control. During this period, the accumulation amount of the $CO_2$ absorbing solution 16 in the $CO_2$ recovering unit 31-2, the supply amount of the makeup water 76, and the liquid level of the rich solution 17 accumulated in the liquid pool at the tower bottom of the $CO_2$ absorber 12 are constant.

As described above, the automatic control may be continuously measured or periodically measured. The measurement interval is not particularly limited.

When the value measured by the supply gas flowmeter 71 is changed (when the gas supply amount increases in this embodiment), in the measurement by the level controller 77, the measured value (indicated by a solid line portion in FIG. 5) of the liquid level of the rich solution 17 at the bottom of the $CO_2$ absorber 12, which is detected by the absorbing solution level meter 72, and the measured value of the gas supply amount measured by the supply gas flowmeter 71 are transmitted to the calculation unit 81 in the state of the automatic control, thereby obtaining the set value of the liquid level of the rich solution 17 accumulated in the liquid pool of the tower bottom of the $CO_2$ absorber 12 (as indicated by the dashed line portion in FIG. 5). As for the calculation of the set value of the liquid level of the rich solution 17 in the calculation unit 81, even when the gas supply amount of the exhaust gas 15B to the $CO_2$ absorber 12 is not changed, the set value of the liquid level of the rich solution 17 is calculated constantly. If the gas supply amount of the exhaust gas 15B to the $CO_2$ absorber 12 is not changed, the set value of the liquid level of the rich solution 17 does not change. When the gas supply amount of the exhaust gas 15B, the accumulation amount of the $CO_2$ absorbing solution 16 in the $CO_2$ recovering unit 31-2 is increased, but the level controller 77 can obtain the proper supply amount of the makeup water 76 based on the set value of the liquid level of the rich solution 17 calculated by the calculation unit 81. This makes it possible to maintain the concentration of the $CO_2$ absorbing solution 16 at a constant level.

In addition to the supply amount of the makeup water 76, the condensation amount of water contained in the exhaust gas 15B may be adjusted. In the case of adjusting the condensation amount of water contained in the exhaust gas 15B, as described above, there are methods such as the method of changing the cooling ratio of the exhaust gas 15B by the cooling tower 11 to change the condensation amount of water contained in the exhaust gas 15B, and the method of lowering the cooling temperature of the semi-rich solution 35 in the $CO_2$ absorber 12 to further lower the gas temperature of the exhaust gas 15B contacting the semi-rich solution 35 and increasing the condensation amount of water contained in the exhaust gas 15B.

After the end of the change in the gas supply amount of the exhaust gas 15B to the $CO_2$ absorber 12, the measured value with each of the liquid level of the rich solution 17 at the bottom of the $CO_2$ absorber 12, the supply amount of the makeup water 76, the accumulation amount of the $CO_2$ absorbing solution 16 in the $CO_2$ recovering unit 31-2, and the gas supply amount of the exhaust gas 15B are constant.

Therefore, in the case of performing an operation control using the $CO_2$ recovering apparatus 10B according to this embodiment, the level controller 77 can obtain the proper supply amount of the makeup water 76 based on the set value of the liquid level of the rich solution 17 calculated by the calculation unit 81, even when the gas supply amount of the exhaust gas 15B increases and the amount of the semi-rich solution 35 to be stored in the $CO_2$ recovering unit 31-1 increases. This prevents the supply amount of the makeup water 76 and the condensation amount of water contained in the exhaust gas 15B from increasing, thereby making it possible to maintain the concentration of the $CO_2$ absorbing solution 16 at a constant level. As a result, the absorption performance of $CO_2$ contained in the exhaust gas 15B within the $CO_2$ absorber 12 can be maintained.

Thus, according to the $CO_2$ recovering apparatus 10B of this embodiment, even when the liquid level of the rich solution 17 at the bottom of the $CO_2$ absorber 12, which is detected by the absorbing solution level meter 72, due to the change in the gas supply amount of the exhaust gas 15B to the $CO_2$ absorber 12, the level controller 77 can obtain the proper supply amount of makeup water 76 and the condensation amount of water contained in the exhaust gas 15B, based on the set value of the liquid level of the rich solution 17 calculated by the calculation unit 81. Consequently, the concentration of the $CO_2$ absorbing solution 16 can be stably maintained at a constant level even when the operation is performed for a long period of time.

Even when the liquid level of the rich solution 17 at the bottom of the $CO_2$ absorber 12 is changed, the level controller 77 can obtain the proper supply amount of the makeup water 76 and the condensation amount of water contained in the exhaust gas 15B while maintaining the automatic control, thereby enabling continuous control based on the gas supply amount of the exhaust gas 15B. That is, in the $CO_2$ recovering apparatus 10A according to the first embodiment, it is necessary to determine that the gas supply amount of the exhaust gas 15B and the like have considerably changed. According to the this embodiment, however, even when the gas supply amount of the exhaust gas 15B has not considerably changed, the supply amount of the makeup water 76 and the condensation amount of water contained in the exhaust gas 15B can be continuously controlled from the gas supply amount of the exhaust gas 15B, and the concentration of the $CO_2$ absorbing solution 16 can be constantly and stably maintained at a constant level.

Accordingly, the $CO_2$ recovering apparatus 10B according to this embodiment is capable of stably and simply maintaining the absorption performance of the $CO_2$ contained in the exhaust gas 15B of the $CO_2$ absorbing solution 16. Further, the $CO_2$ absorbing solution 16 can be efficiently utilized without wasting amine contained in the $CO_2$ absorbing solution 16. Thus, the steam 54 required to release $CO_2$ contained in the rich solution 17 can be efficiently utilized by the regenerator 13, which results in improvement in the operational efficiency of the $CO_2$ recovering apparatus 10B.

In this embodiment, the liquid level of the rich solution 17 at the bottom of the $CO_2$ absorber 12 is obtained from the gas supply amount of the exhaust gas 15B, but this embodiment is not limited to this. Alternatively, the liquid level of the rich solution 17 at the bottom of the $CO_2$ absorber 12 may be obtained from the loading state of an apparatus, such as a boiler, which is installed at the upstream side of the $CO_2$ absorber 12.

Third Embodiment

A $CO_2$ recovering apparatus according to a third embodiment of the present invention will be described with reference to the drawings. Note that the configuration of the $CO_2$ recovering apparatus according to this embodiment is similar to the configuration of the $CO_2$ recovering apparatus illustrated in FIG. 1 described above. Accordingly, the components identical with those of the $CO_2$ recovering apparatus illustrated in FIG. 1 are denoted by the same reference numerals, and the description thereof is omitted.

Figure 6:
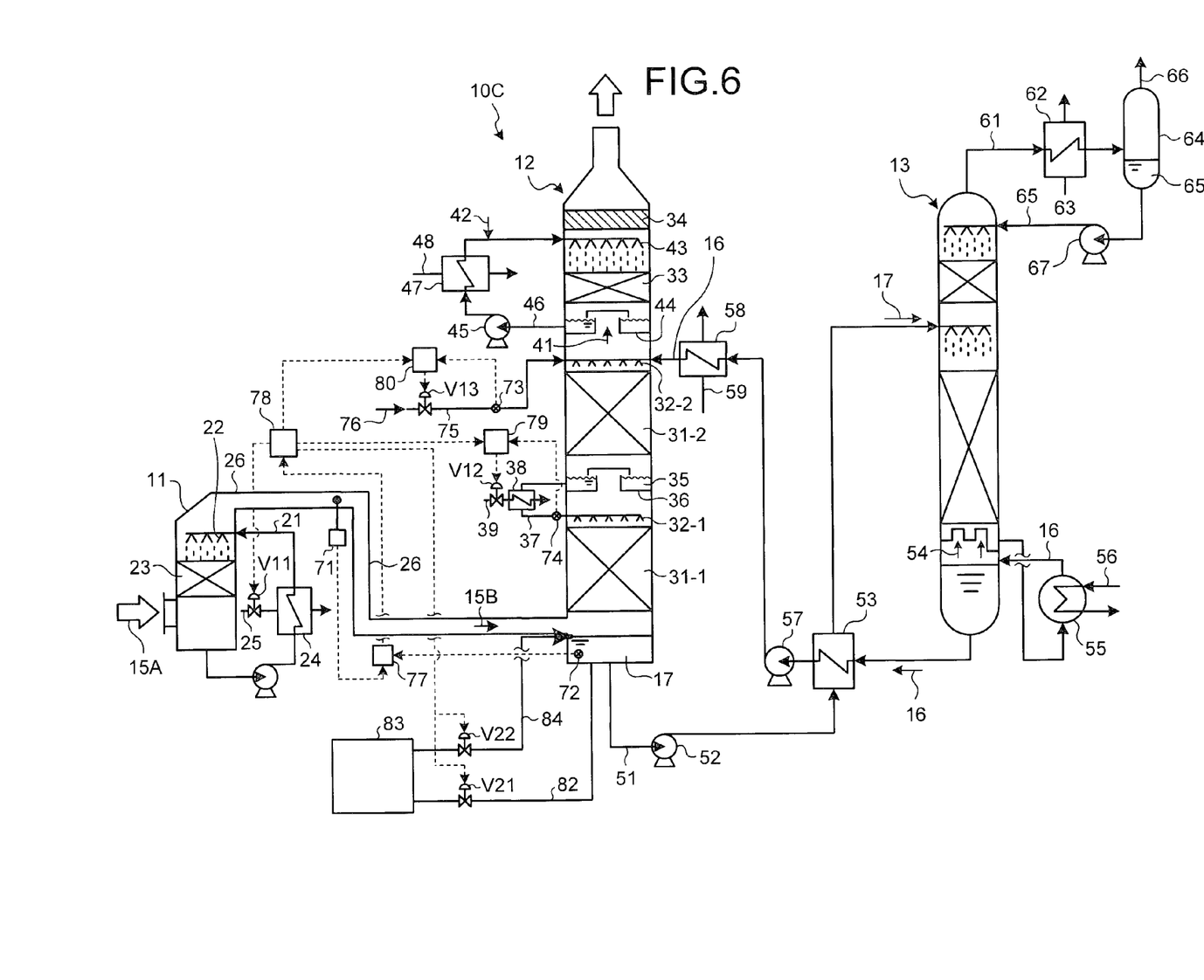
FIG. 6 is a diagram schematically illustrating a configuration of a $CO_2$ recovering apparatus according to a third embodiment of the present invention.

FIG. 6 is a diagram schematically illustrating the configuration of the $CO_2$ recovering apparatus according to the third embodiment of the present invention. As illustrated in FIG. 6, a $CO_2$ recovering apparatus 10C according to this embodiment includes an absorbing solution extraction pipe 82 that extracts the rich solution 17 at the bottom of the $CO_2$ absorber 12; an absorbing solution storage unit 83 that stores the extracted rich solution 17; and an absorbing solution feed pipe 84 that feeds the rich solution 17 accumulated in the absorbing solution storage unit 83 to the bottom of the $CO_2$ absorber 12. The absorbing solution extraction pipe 82 and the absorbing solution feed pipe 84 are provided with control valves V21 and V22 that adjust the flow rate of the rich solution 17.

The $CO_2$ recovering apparatus 10C according to this embodiment extracts the rich solution 17 from the bottom of the $CO_2$ absorber 12 to the absorbing solution storage unit 83 through the absorbing solution extraction pipe 82 when the load of the boiler or the like drops, and supplies the rich solution 17 within the absorbing solution storage unit 83 to the bottom of the $CO_2$ absorber 12 when the load of the boiler or the like rises. Therefore, the $CO_2$ recovering apparatus 10C according to this embodiment is capable of adjusting the liquid level of the rich solution 17 at the bottom of the $CO_2$ absorber 12 depending on the loading state of the apparatus that generates exhaust gas of the boiler or the like.

(Operation Control)

Next, a description is given of an example of the operation control for stably keeping, at a constant level, the concentration of the $CO_2$ absorbing solution 16, which circulates in the system space even when the gas supply amount of the exhaust gas 15B to be supplied to the $CO_2$ absorber 12 is changed by using the $CO_2$ recovering apparatus 10C according to this embodiment.

Figure 7:
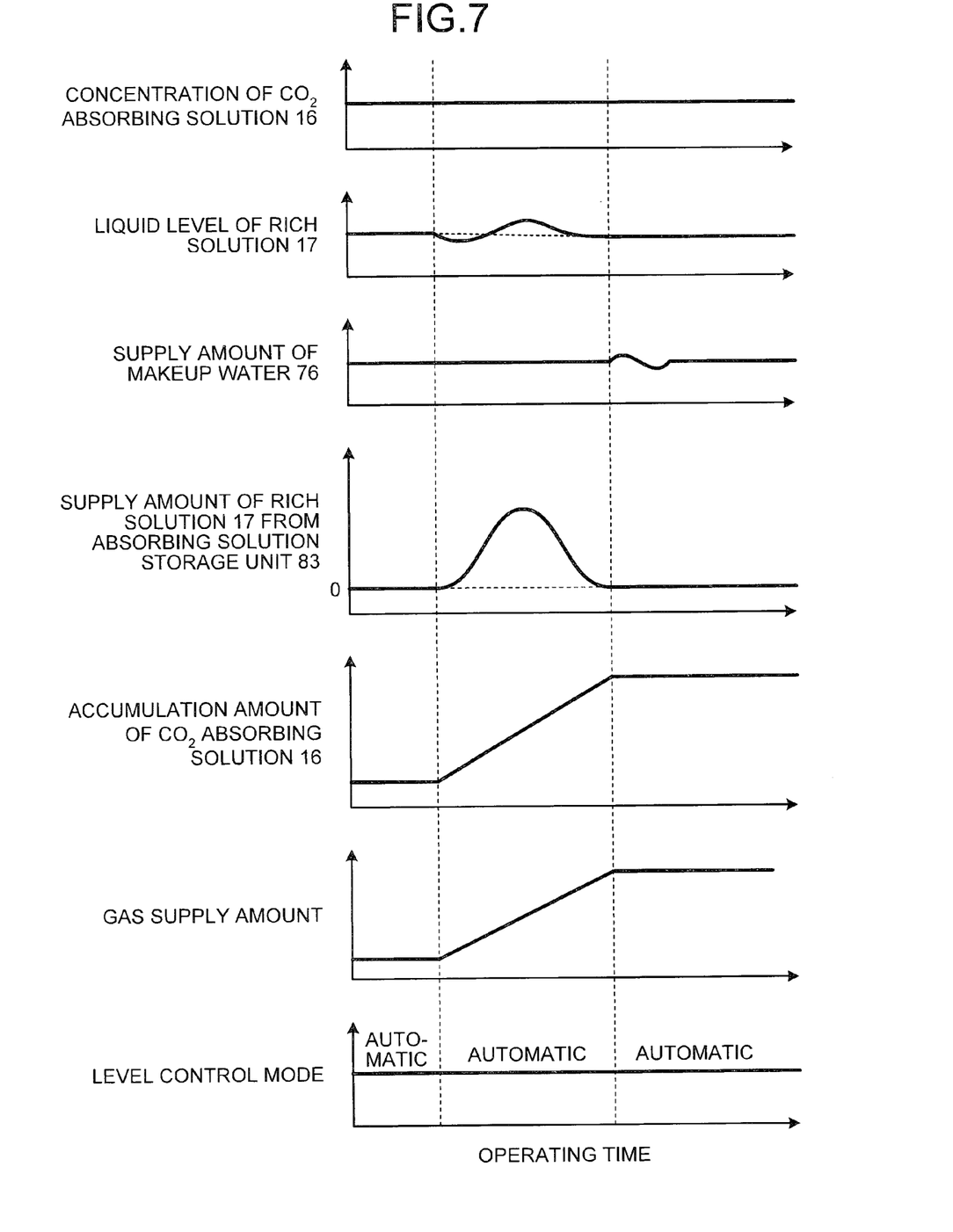
FIG. 7 is a diagram illustrating a relationship between an operating time and various measured values of the $CO_2$ recovering apparatus according to the third embodiment of the present invention.

FIG. 7 is a diagram illustrating a relationship between the operating time and various measured values of the $CO_2$ recovering apparatus 10C according to this embodiment. As illustrated in FIG. 7, while the gas supply amount of the exhaust gas 15B, which is measured by the supply gas flowmeter 71, to the $CO_2$ absorber 12 is not changed (at a constant gas supply amount), the measurement by the level controller 77 is performed by the automatic control. During this period, the accumulation amount of the $CO_2$ absorbing solution 16 in the $CO_2$ recovering unit 31-2, the supply amount of the rich solution 17 from the absorbing solution storage unit 83, the supply amount of the makeup water 76, and the liquid level of the rich solution 17 accumulated in the liquid pool at the tower bottom of the $CO_2$ absorber 12 are constant. Further, in the state where the gas supply amount to the $CO_2$ absorber 12 is not changed, the supply amount of the rich solution 17 from the absorbing solution storage unit 83 is zero. The amount of the rich solution 17 extracted from the bottom of the $CO_2$ absorber 12 is also zero.

The automatic control may be carried out by continuous measurement or periodical measurement. The measurement interval is not particularly limited.

When the gas supply amount measured by the supply gas flowmeter 71 is changed (when the gas supply amount increases in this embodiment), the accumulation amount of the $CO_2$ absorbing solution 16 in the $CO_2$ recovering unit 31-2 increases. In this case, the liquid level of the rich solution 17 decreases, but the set value of the supply amount of the makeup water 76 is maintained at the set value obtained before the gas supply amount is changed, and the set value of the supply amount of the makeup water 76 is not determined by the level controller 77 based on the calculated value. The automatic control is maintained to carry out the measurement by the level controller 77. The level controller 77 switches the output destination of the manipulation unit 78 to the control valve V22 based on the value calculated by the level controller 77, and operates the control valve V22, thereby supplying the rich solution 17 in the absorbing solution storage unit 83 to the bottom of the $CO_2$ absorber 12. Further, when the rich solution 17 in the absorbing solution storage unit 83 is supplied to the bottom of the $CO_2$ absorber 12, the liquid level of the rich solution 17 at the bottom of the $CO_2$ absorber 12, which is detected by the absorbing solution level meter 72, is increased and stabilized.

On the other hand, when the rich solution 17 is extracted from the bottom of the $CO_2$ absorber 12, the automatic control is maintained to carry out the measurement by the level controller 77, the level controller 77 switches the output destination of the manipulation unit 78 to the control valve V21 based on the value calculated by the level controller 77, and the control valve V21 is released and the rich solution 17 is extracted from the bottom of the $CO_2$ absorber 12 into the absorbing solution storage unit 83. Accordingly, the liquid level of the rich solution 17 at the bottom of the $CO_2$ absorber 12 can be maintained at a constant level, thereby making it possible to maintain the concentration of the $CO_2$ absorbing solution 16 at a constant level.

After the end of the change in the gas supply amount of the exhaust gas 15B to the $CO_2$ absorber 12, the supply of rich solution 17 of the $CO_2$ absorber 12 from the absorbing solution storage unit 83 to the bottom of the $CO_2$ absorber 12 is interrupted, or the extraction of the rich solution from the bottom of the $CO_2$ absorber 12 to the absorbing solution storage unit 83 is interrupted. The set value of the supply amount of the makeup water 76 is switched so as to be determined based on the value calculated by the level controller 77. Thus, the liquid level of the rich solution 17 at the bottom of the $CO_2$ absorber 12, the supply amount of the makeup water 76, the supply amount of the rich solution 17 within the absorbing solution storage unit 83, and the accumulation amount of the $CO_2$ absorbing solution 16 in the $CO_2$ recovering unit 31-2 are constant.

Depending on the gas supply amount of the exhaust gas 15B, the liquid level of the rich solution 17 at the bottom of the $CO_2$ absorber 12 may exceed the upper limit or the lower limit. Specifically, when the gas supply amount of the exhaust gas 15B increases and the amount of the semi-rich solution 35 to be stored in the $CO_2$ recovering unit 31-1 is too large, the liquid level of the rich solution 17 at the bottom of the $CO_2$ absorber 12 becomes lower than the lower limit. Further, when the gas supply amount of the exhaust gas 15B decreases too much, the semi-rich solution 35 is not stored in the $CO_2$ recovering unit 31-1, so that the liquid level of the rich solution 17 at the bottom of the $CO_2$ absorber 12 exceeds the upper limit.

The $CO_2$ recovering apparatus 10C according to this embodiment couples the absorbing solution storage unit 83 with the absorbing solution extraction pipe 82 and the absorbing solution feed pipe 84, thereby enabling adjustment of the liquid level of the rich solution 17 at the bottom of the $CO_2$ absorber 12. Therefore, even when the gas supply amount to the $CO_2$ absorber 12 is changed and the liquid level of the rich solution 17 at the bottom of the $CO_2$ absorber 12 exceeds an upper limit or a lower limit, the level controller 77 can switch the output destination of the manipulation unit 78 based on the value calculated by the level controller 77 from the gas supply amount measured by the supply gas flowmeter 71, and thus can maintain the liquid level of the rich solution 17 at the bottom of the $CO_2$ absorber 12 at a constant level. This results in preventing the supply amount of the makeup water 76 and the condensation amount of water contained in the exhaust gas 15B from increasing. Accordingly, the concentration of the $CO_2$ absorbing solution 16 can be maintained at a constant level. As a result, the $CO_2$ absorption performance in the exhaust gas 15B in the $CO_2$ absorber 12 can be maintained.

Further, the liquid level of the rich solution 17 at the bottom of the $CO_2$ absorber 12 can be maintained at a constant level while the level controller 77 is allowed to perform the automatic control, thereby enabling continuous control based on the gas supply amount of the exhaust gas 15B. This results in suppression of an increase in the supply amount of the makeup water 76 supplied to the $CO_2$ absorber 12 and the condensation amount of water contained in the exhaust gas 15B. Accordingly, even when the operation is performed for a long period of time, the concentration of the $CO_2$ absorbing solution 16 can be maintained at a constant level.

Therefore, the $CO_2$ recovering apparatus 10C according to this embodiment is capable of stably maintaining the absorption performance of $CO_2$ contained in the exhaust gas 15B to the $CO_2$ absorbing solution 16 even in the situation where it is difficult to measure the liquid level of the rich solution 17 at the bottom of the $CO_2$ absorber 12 depending on the loading state of the apparatus that generates exhaust gas of the boiler or the like.

Moreover, in the $CO_2$ recovering apparatus 10C according to this embodiment, the rich solution 17 is extracted and fed from the bottom of the $CO_2$ absorber 12, but this embodiment is not limited to this. Alternatively, the $CO_2$ absorbing solution 16 may be extracted and fed from the bottom of the regenerator 13.

REFERENCE SIGNS LIST 10A to 10C $CO_2$ RECOVERING APPARATUS
11 COOLING TOWER
12 $CO_2$ ABSORBER
13 ABSORBING SOLUTION REGENERATOR
15A, 15B EXHAUST GAS
16 $CO_2$ ABSORBING SOLUTION (LEAN SOLUTION)
17 RICH SOLUTION
21, 42, 65 WATER
22, 32-1, 32-2, 43 SPRAY NOZZLE
23 COOLING UNIT
24, 38, 47 COOLER
25, 39, 48, 59, 63 CHILLED WATER
26 FLUE
31-1, 31-2 $CO_2$ RECOVERING UNIT
33 WASHING UNIT
34 DEMISTER
35 SEMI-RICH SOLUTION
36, 44 RECEIVING UNIT
37 SEMI-RICH SOLUTION EXTRACTION PIPE
41 $CO_2$ REMOVED EXHAUST GAS
46 WATER CIRCULATION LINE
51 RICH SOLUTION EJECTION LINE
52 RICH SOLUTION DISCHARGE PUMP (RICH SOLVENT PUMP)
53 RICH/LEAN SOLUTION HEAT EXCHANGER
54 STEAM
55 REGENERATION SUPERHEATER (REBOILER)
56 SATURATED STEAM
57 LEAN SOLVENT PUMP
58 LEAN SOLVENT COOLER
61 $CO_2$ GAS
62 CONDENSER
64 SEPARATION DRUM
67 CONDENSED WATER CIRCULATING PUMP
71 SUPPLY GAS FLOWMETER
72 ABSORBING SOLUTION LEVEL METER
73 MAKEUP WATER FLOWMETER
74 THERMOMETER
75 MAKEUP WATER SUPPLY LINE
76 MAKEUP WATER
77 LEVEL CONTROLLER
78 MANIPULATION UNIT
79, 80 CONTROL UNIT
81 CALCULATION UNIT
82 ABSORBING SOLUTION EXTRACTION PIPE
83 ABSORBING SOLUTION STORAGE UNIT
84 ABSORBING SOLUTION FEED PIPE
V11 to V13, V21, V22 CONTROL VALVE

The invention claimed is:

1. An operation control method of a $CO_2$ recovering apparatus comprising:
a $CO_2$ absorber including a $CO_2$ recovering unit that brings an exhaust gas containing $CO_2$ into contact with water to cool the exhaust gas and brings the exhaust gas into contact with a $CO_2$ absorbing solution absorbing $CO_2$ to eliminate CO2 contained in the exhaust gas; and a regenerator that eliminates $CO_2$ contained in the $CO_2$ absorbing solution having absorbed $CO_2$ to regenerate the $CO_2$ absorbing solution, the operation control method comprising:

recycling, by the $CO_2$ absorber, the $CO_2$ absorbing solution obtained by eliminating $CO_2$ by the regenerator;

measuring, by an absorbing solution level meter, a liquid level of the $CO_2$ absorbing solution at a tower bottom of the $CO_2$ absorber; and performing, by a level controller, one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter, wherein the level controller is switched to the automatic control while a change in the gas supply amount of the exhaust gas to be supplied to the $CO_2$ absorber is finished, and the level controller is switched to the manual control while the gas supply amount of the exhaust gas to be supplied to the $CO_2$ absorber is changed, to thereby maintain, at a constant level, one or both of the supply amount of the makeup water and the condensation amount of water contained in the exhaust gas.

2. The operation control method according to claim 1, wherein when a change in the gas supply amount of the exhaust gas supplied to the $CO_2$ absorber is constant and the level controller is switched from the manual control to the automatic control, measured values of the liquid level of the $CO_2$ absorbing solution at the tower bottom of the $CO_2$ absorber, the supply amount of the makeup water, the accumulation amount of the $CO_2$ absorbing solution, and the gas supply amount of the exhaust gas are changed to set values which are reference values for the measured values.

3. An operation control method of a $CO_2$ recovering apparatus comprising:

a $CO_2$ absorber including a $CO_2$ recovering unit that brings an exhaust gas containing $CO_2$ into contact with water to cool the exhaust gas and brings the exhaust gas into contact with a $CO_2$ absorbing solution to eliminate $CO_2$ contained in the exhaust gas; and a regenerator that eliminates $CO_2$ contained in the $CO_2$ absorbing solution having absorbed $CO_2$ to regenerate the $CO_2$ absorbing solution, the operation control method comprising:

recycling, by the $CO_2$ absorber, the $CO_2$ absorbing solution obtained by eliminating $CO_2$ by the regenerator;

measuring, by an absorbing solution level meter, a liquid level of the $CO_2$ absorbing solution at a tower bottom of the $CO_2$ absorber; and performing, by a level controller, one of automatic control and manual control for one or both of a supply amount of makeup water to be supplied to the $CO_2$ absorber and a condensation amount of water contained in the exhaust gas, based on the liquid level of the $CO_2$ absorbing solution detected by the absorbing solution level meter; wherein while a gas supply amount of the exhaust gas to be supplied to the $CO_2$ absorber is changed, one of the gas supply amount of the exhaust gas to be supplied to the $CO_2$ absorber and a load of an apparatus that generates the exhaust gas is applied to a relationship between one of the preliminarily obtained gas supply amount of the exhaust gas and the load of the apparatus that generates the exhaust gas, and a set value of the liquid level of the $CO_2$ absorbing solution at the bottom of the $CO_2$ absorber detected by the absorbing solution level meter, and wherein the level controller controls the set value of one or both of the supply amount of the makeup water and the condensation amount of water contained in the exhaust gas.

4. The operation control method according to claim 3, wherein the condensation amount of water contained in the exhaust gas is adjusted by using one or both of a method of changing a cooling ratio of the exhaust gas by the cooling tower, and a method of changing a cooling temperature of the $CO_2$ absorbing solution within the $CO_2$ absorber.

5. The operation control method according to claim 3, further comprising:

extracting the $CO_2$ absorbing solution at the bottom of the $CO_2$ absorber depending on a loading state of the apparatus that generates the exhaust gas;

storing the extracted $CO_2$ absorbing solution, or feeding the stored $CO_2$ absorbing solution to the bottom of the $CO_2$ absorber; and adjusting a liquid amount of the $CO_2$ absorbing solution at the bottom of the $CO_2$ absorber.

6. The operation control method claim 1, wherein the condensation amount of water contained in the exhaust gas is adjusted by using one or both of a method of changing a cooling ratio of the exhaust gas by the cooling tower, and a method of changing a cooling temperature of the $CO_2$ absorbing solution within the $CO_2$ absorber.

7. The operation control method claim 1, further comprising:

extracting the $CO_2$ absorbing solution at the bottom of the $CO_2$ absorber depending on a loading state of the apparatus that generates the exhaust gas;

storing the extracted $CO_2$ absorbing solution, or feeding the stored $CO_2$ absorbing solution to the bottom of the $CO_2$ absorber; and adjusting a liquid amount of the $CO_2$ absorbing solution at the bottom of the $CO_2$ absorber.

* * * * *